United States Patent [19]

Hilbig et al.

[11] 4,310,663
[45] Jan. 12, 1982

[54] CONTINUOUS PROCESS FOR PRODUCING WATER-SOLUBLE HYDROXYALKYL CELLULOSE AND RELATED ETHERS

[75] Inventors: Josef Hilbig, Taunusstein; Arno Holst, Wiesbaden; Hans Künkler, Wiesbaden; Klaus Stölting, Wiesbaden; Wolfgang Schminke, Wiesbaden, all of Fed. Rep. of Germany

[73] Assignee: Hoechst Aktiengesellschaft, Frankfurt am Main, Fed. Rep. of Germany

[21] Appl. No.: 156,404

[22] Filed: Jun. 4, 1980

[30] Foreign Application Priority Data

Jun. 15, 1979 [DE] Fed. Rep. of Germany ....... 2924330

[51] Int. Cl.³ .................... C08G 59/68; C08B 11/08
[52] U.S. Cl. ........................ 536/91; 536/84; 536/95; 536/96
[58] Field of Search ................ 536/91, 95, 96, 84

[56] References Cited

U.S. PATENT DOCUMENTS

| | | | |
|---|---|---|---|
| 2,101,263 | 12/1937 | Maxwell | 536/96 |
| 2,847,411 | 8/1958 | Mitchell et al. | 536/96 |
| 3,045,007 | 7/1962 | Mitchell et al. | 536/96 |
| 3,131,176 | 4/1964 | Klug | 536/96 |
| 3,131,177 | 4/1964 | Klug et al. | 536/96 |
| 3,278,521 | 10/1966 | Klug | 536/95 |
| 3,296,247 | 1/1967 | Klug | 106/197 R |
| 3,544,556 | 12/1970 | Eichenseer et al. | 536/91 |
| 4,015,067 | 3/1977 | Liu et al. | 536/96 |
| 4,017,671 | 4/1977 | Schminke et al. | 536/98 |

FOREIGN PATENT DOCUMENTS

| | | |
|---|---|---|
| 765441 | 11/1952 | Fed. Rep. of Germany . |
| 1251729 | 10/1967 | Fed. Rep. of Germany . |
| 415383 | 8/1934 | United Kingdom . |
| 482885 | 4/1938 | United Kingdom . |
| 782842 | 9/1957 | United Kingdom . |
| 817809 | 8/1959 | United Kingdom . |
| 1038757 | 8/1966 | United Kingdom . |

*Primary Examiner*—A. Lionel Clingman
*Attorney, Agent, or Firm*—Schwartz, Jeffery, Schwaab, Mack, Blumenthal & Koch

[57] ABSTRACT

A continuous process for manufacturing water-soluble hydroxyalkyl cellulose, and water-soluble mixed ethers based on hydroxyalkyl cellulose, comprising producing a slurry comprising (by weight) 1 part cellulose, 0.02 to 0.6 parts alkali metal hydroxide, 5 to 10 parts inert organic solvent, and 0.4 to 2.5 parts water; continuously feeding the slurry to a first elevated pressure reactor and mixing the slurry therein with at least one normally gaseous etherifying agent which has been liquified under pressure; maintaining the slurry at a temperature up to 40° C., and a gauge pressure up to 3 bars, for 15 to 90 minutes, to give a degree of substitution from 0.2 to 1.0; continuously circulating the slurry in the first reactor in a loop through a homogenizing device to form a homogenized slurry; continuously feeding the homogenized slurry through a tubular reactor having a conveying device, an inlet, and first and second parts, and reacting the homogenized slurry in the tubular reactor for 70 to 180 minutes at a temperature from 30° to 120° C., under a gauge pressure of up to 10 bars, continuously transferring the reacted slurry into a cooling device; and subsequently purifying the etherified compounds; and apparatus for performing the process utilizing pressurized etherifying reactors and a heated tubular reactor.

15 Claims, 1 Drawing Figure

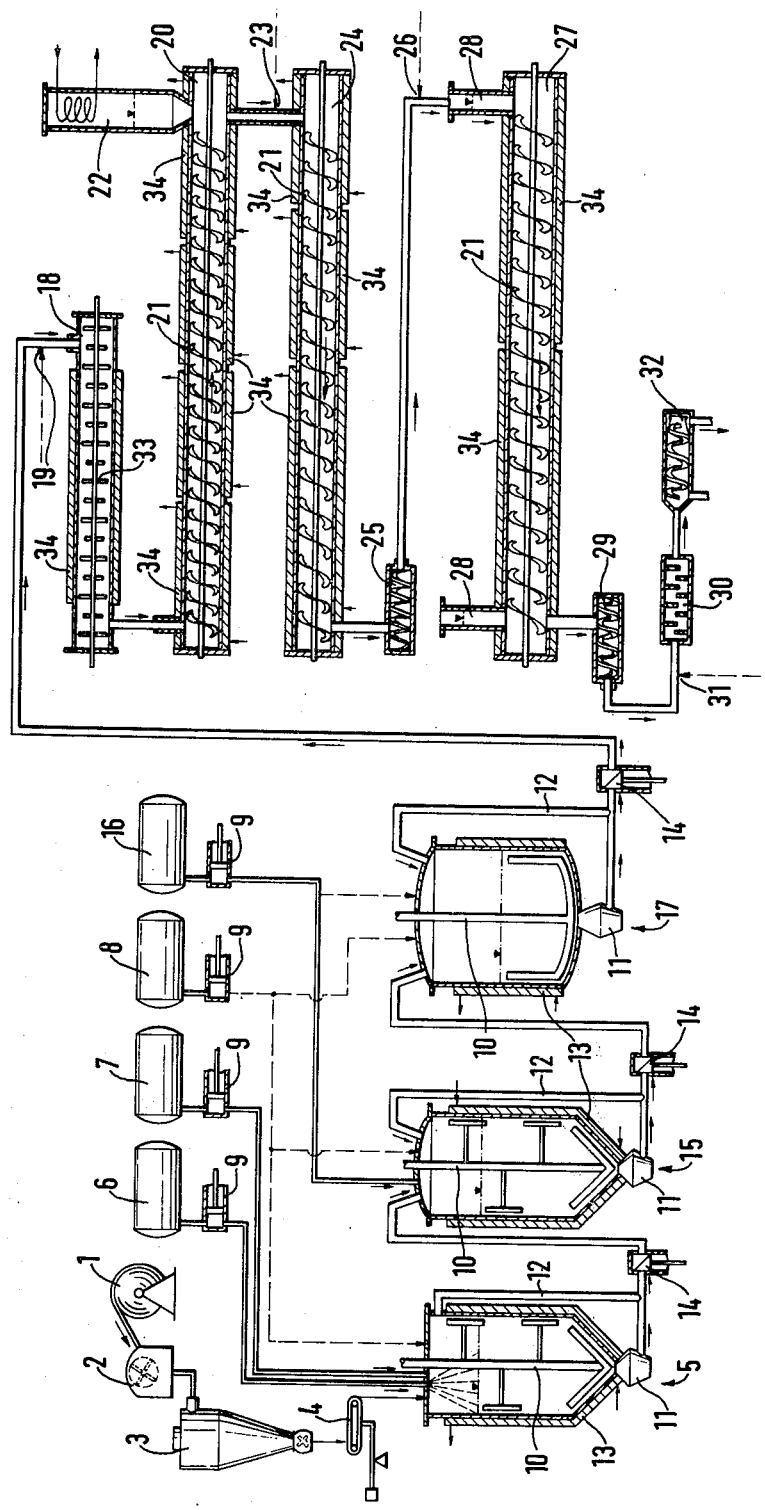

CONTINUOUS PROCESS FOR PRODUCING WATER-SOLUBLE HYDROXYALKYL CELLULOSE AND RELATED ETHERS

The invention relates to a continuous process for the manufacture of water-soluble hydroxyalkyl cellulose of water-soluble mixed ethers thereof, based on hydroxyalkyl cellulose, and to equipment for carrying out the process.

BACKGROUND OF THE INVENTION

The family of the cellulose ethers, used for a long time in many industrial fields, include water-soluble hydroxyalkyl celluloses (HAlkC) and related ethers, such as hydroxyethyl cellulose (HEC), hydroxypropyl cellulose (HPC), hydroxyethyl-hydroxypropyl cellulose (HEHPC), hydroxyethyl-methyl cellulose (HEMC), and hydroxyethylcarboxymethyl cellulose (HECMC). The properties, manufacturing processes and fields of application of these cellulose ethers are described, for example, in Ullmanns Encyklopaedie der technischen Chemie (Ullmanns Encyclopedia of Industrial Chemistry), Verlag Chemie—Weinheim, 4th Edition, Volume 9, 1975, keyword "Celluloseäther" ("cellulose ethers"), pages 192 to 212.

A continuous process for the manufacture of HEC is known (Ullmann, page 206) in which 2 to 8% of ethylene oxide is absorbed, but this leads to water-insoluble products. Higher degrees of etherification are said to lead to a product having an undesirably pasty consistency, resulting in difficulties in the subsequent use of such product in manufacturing processes. Therefore, prior art processes for the manufacture of water-soluble hydroxyalkyl cellulose and mixed ethers thereof are normally carried out discontinuously as suspension ("slurry") processes in the presence of inert organic solvents, such as isopropanol, tert.-butanol or acetone.

British Pat. No. 482,885 describes a continuous process for the manufacture of water-insoluble, alkali-soluble cellulose ethers, such as MC, CMC or HEC, having a low degree of substitution, wherein a dissolved etherifying agent is reacted in a quantity of 0.1 to 2 moles under alkaline conditions with alkali cellulose, without applying pressure.

The continuous process for the manufacture of water-insoluble, alkali-soluble hydroxyethyl cellulose according to British Pat. No. 782,842, German Auslegeschrift No. 1,251,729 or U.S. Pat. No. 2,847,411 is carried out with gaseous ethylene oxide as the etherifying reagent in such a way that 2 to 8% by weight of ethylene oxide, relative to the weight of the cellulose, are reacted. A similar procedure using a proportion of ethylene oxide of less than 2% by weight is described in British Pat. No. 817,809.

German Pat. No. 765,441 has disclosed a continuous process for the etherification of cellulose, wherein alkali cellulose is reacted in single-screw or multi-screw devices with liquid organic etherifying agents; the only example of an etherifying agent mentioned is benzyl chloride.

U.S. Pat. No. 3,131,177 describes a discontinuous process for the manufacture of water-soluble hydroxyalkyl cellulose (HAlkC), in which cellulose slurried in a water-soluble ketone, such as acetone, is reacted with an alkylene oxide in the presence of alkali and water. The two-stage etherification process is carried out in such a way that: (a) the etherification is initially carried out at about 80° C. with a quantitative ratio of 0.2 to 0.8 parts by weight of NaOH and 0.8 to 4.0 parts by weight of water per part by weight of cellulose to give a molar degree of substitution (MS) of 1.0; (b) 70 to 98% of the alkali is neutralized; and (c) the etherification is continued up to a MS of 1.5 to 3.0. A similar discontinuous, two-stage etherification procedure is also described in U.S. Pat. No. 3,131,176.

A discontinuous process for the manufacture of hydroxyethyl cellulose (HEC) is disclosed in German Auslegeschrift No. 1,518,979, which corresponds to British Pat. No. 1,038,757. The process is carried out with a mixture of isopropanol and tert.-butanol as a dispersing agent (slurrying agent). The proportion of isopropanol in the mixture is between 2 and 25% by weight. The parameters of this process are selected such that: (a) a mixture of dispersing agent, water, NaOH and cellulose is produced at 30° C. in the course of 30 minutes; (b) ethylene oxide is added to this mixture in a reactor; (c) the temperature is adjusted up to 50° C. over a period of 30 minutes and this temperature is maintained for 90 minutes; (d) the temperature is raised to 80° C. and this temperature is maintained for 30 minutes; and (e) the reaction vessel is cooled, the NaOH is neutralized, the crude product is purified with 80% strength aqueous acetone followed by anhydrous acetone, and the purified product is dried at less than 90° C. The quantitative proportions (in parts by weight) of the components are: 1 part by weight of dry cellulose; 2 to 50 parts of dispersing agent; 0.05 to 10 parts of NaOH and 1.2 to 2.5 parts of water. Ethylene oxide, 2,3-epoxypropan-1-ol, epichlorohydrin, butadiene monoxide and ethylene chlorohydrin are mentioned as hydroxyethylating agents. The process is said to be suitable both for the manufacture of water-soluble HEC having a MS of 1.5 to 2.5 and for the manufacture of water-soluble HEC having a MS of less than 1.0.

U.S. Pat. No. 3,296,247 discloses a discontinuous process for the manufacture of hydroxyethylhydroxypropyl cellulose (HEHPC) having a $MS_{HE}$ of 0.05 to 1.0 and a $MS_{HP}$ of 2 to 10. This product is soluble in cold water and polar organic solvents, insoluble in hot water, and is a thermoplastic. The etherifying agents ethylene oxide and propylene oxide are reacted simultaneously at about 70° C. in a closed pressure vessel.

Continuous processes for the manufacture of certain other water-soluble cellulose ethers are also known in the art, in particular, processes for the manufacture of carboxymethyl cellulose (CMC), methyl cellulose (MC) and methyl-hydroxyalkyl cellulose (MHAlkC). U.S. Pat. No. 3,544,556 describes a continuous process for the manufacture of methyl cellulose (MC) or methylhydroxyalkyl cellulose (MHAlkC), in which alkali cellulose is reacted with excess liquid methyl chloride or a mixture of liquid methyl chloride and liquid alkylene oxide in the presence of likewise liquid dimethyl ether at an elevated temperature. The weight employed of the etherifying liquid components is 5 to 10 times that of the dry cellulose contained in the alkali cellulose and, additionally, 2 to 30% by weight of dimethyl ether, relative to methyl chloride employed, is used, the dimethyl ether being formed only by side reactions from the methyl chloride. The process comprises the following steps: (a) the mixture of alkali cellulose, etherifying agent and dimethyl ether is brought to 70° C. to 95° C. immediately after entering a reaction tube; (b) the reaction mixture is passed continuously in the same direction through the tube which is provided with a conveyor screw and with a heating jacket. The liquid exchange medium of the jacket flows in counter-current to the reaction mixture; (c) the methyl chloride vapor generated in the tube is condensed in order to maintain the reaction mixture at the requisite temperature; (d) the reaction mixture is continuously withdrawn; (e) the withdrawn reaction mixture is, with let-down, washed with water of 75° to 95° C. in co-current, the components escaping as gases being recondensed and recycled. The amounts of etherifying agents within said recycled components which were consumed during steps a to c are replenished, so that a constant content of dimethyl ether within said range is established in the reaction mixture flowing through the reaction tube; and (f) the MC or MHAlkC is isolated in a customary manner.

U.S. Pat. No. 4,017,671 discloses a process for the continuous manufacture of the sodium salt of carboxymethyl cellulose (NACMC), in which an etherification mixture, which initially contains alkali cellulose, formed from finely comminuted pulp and sodium hydroxide solution, sodium monochloroacetate and water, is conveyed through a reaction chamber at a temperature of at least 60° C., which is kept constant in each section of the reaction chamber, in such a way that the residence time of the etherification mixture in the reaction chamber is adequate for reacting the sodium monochloroacetate initially contained therein. The process has the following features: (a) the etherification mixture conveyed through the reaction chamber contains 0.2 to 0.6 parts by weight of NaOH, 0.5 to 1.75 parts by weight of sodium monochloroacetate, 7 to 22 parts by weight of isopropyl alcohol and 1.4 to 11 parts by weight of water per 1 part by weight of pulp; (b) the temperature of the etherification mixture is maintained in the reaction chamber in the range from 60° C. to 90° C.; (c) the shearing forces are caused, by means of a homogenizer, to act on the etherification mixture before the latter enters the reaction chamber and at a temperature which is below 30° C.; (d) the residence time of the etherification mixture in the homogenizing zone is less than 1/10 of its residence time in the reaction chamber; and (e) after the etherification has ended, the liquid constituents of the etherification mixture are separated by mechanical means from its solid constituents.

The process for the manufacture of polysaccharide ethers according to U.S. Pat. No. 4,015,067 is carried out in such a way that: (a) a slurry of a finely divided polysaccharide, an aqueous metal hydroxide and at least one etherifying agent is prepared in the absence of free oxygen, and the temperature is controlled such that the reaction of the alkali polysaccharide with the etherifying agent is kept under control; (b) the slurry is introduced substantially continuously into a tubular reactor which is free from obstacles which could impede the flow of the slurry; (c) the temperature of the slurry is adjusted such that a controlled reaction of the etherifying agent or agents with the alkali polysaccharide takes place, and the desired substitution of the alkali polysaccharide by the etherifying agent is achieved; and (d) the reaction is continued for a period of 10 to 180 minutes while the slurry is passed through the reactor. Cellulose is mentioned as a typical polysaccharide, and it is said that a reaction is also possible with alkylene oxides as the etherifying agent in a quantity of 2 to 20 parts by weight (in particular 6 to 12 parts by weight) relative to 1 part by weight of cellulose.

The processes known from the state of the art, however, have in particular the following disadvantages:

The continuous processes for the manufacture of HEC only lead to a water-insoluble, alkali-soluble HEC, that is to say, under the process conditions used therein, only a low degree of etherification is possible, insufficient to render the HEC thus formed water-soluble.

The discontinuous processes for the manufacture of water-soluble HAlkC, in particular HEC, admittedly give products which can be used industrially, but they cannot be converted without difficulty to a continuous procedure, since a uniform course of the reaction, which is necessary for good solution properties of the products formed, would then no longer be guaranteed.

The continuous processes for the manufacture of the water-soluble cellulose ethers CMC, MC or MHAlkC do not, without further measures, also permit a manufacture of HAlkC or mixed ethers based on HAlkC, since they are carried out, for example, without applying pressure (CMC) and hence make different demands on the type of process and the design of the unit, or since the mixture of etherifying agent and alkali cellulose (MC, MHAlkC) can be reacted substantially without the presence of significant amounts of an inert organic solvent without decisive deterioration with respect to the quality demands, and this mixture is reacted after it has passed only through a relatively simple homogenization step. In particular, the two last-mentioned process parameters, namely carrying out the process in a slurry containing a solvent, and intensive and effective homogenizing before carrying out the actual etherification reaction, require special measures in process control and in the design of the unit.

Although it is mentioned in U.S. Pat. No. 4,015,067, already listed above, that a reaction of cellulose with epoxides, such as ethylene oxide, propylene oxide or butylene oxide, is also possible by the continuous process (col. 5, lines 14–19), concrete data are to be found in the further text only for running the process with monohalogenoalkanes, such as methyl chloride, ethyl chloride, propyl chloride or butyl chloride, to give the alkyl celluloses or especially with alkylene oxides in addition to give the corresponding mixed ethers. A fully continuous procedure is not envisioned, since (col. 2, lines 10–20) the forward motion of the slurry is occasionally interrupted in order to control the temperature in the course of the process, and moreover, the control of the process is also effected via the feed of the individual reactants into the tubular reactor (col. 1, lines 66–68). Regarding the quantity of etherifying agent and inert diluent, it is stated that these are to be used in a quantity of about to ten to twenty times the weight of the cellulose (col. 4, lines 5–6).

SUMMARY OF THE INVENTION

It is therefore an object of the present invention to provide a continuous process for the manufacture of hydroxyalkyl cellulose or mixed ethers thereof, which permits a fully continuous procedure in the actual etherification reaction stage.

It is also an object of the present invention to provide a process for the manufacture of hydroxyalkyl cellulose or mixed ethers thereof, which can be carried out without excessive amounts of organic solvents and/or etherifying agent or agents.

A further object of the invention is to provide a process which gives products which, with respect to their viscosity and solution properties (value and range of the viscosity, fiber content, swelling body content and transparence of the aqueous solutions) are at least comparable with those manufactured by modern discontinuous processes.

Still another object of the present invention is to provide means for performing the above-mentioned process.

In accordance with one aspect of the invention, there is provided a continuous process for the manufacture of water-soluble hydroxyalkyl cellulose, and water-soluble mixed ethers based on hydroxyalkyl cellulose, comprising the steps of producing an initial slurry comprising 1 part by weight of cellulose, about 0.02 to 0.6, and preferably about 0.2 to 0.4 parts by weight of an alkali metal hydroxide, about 5 to 10, and preferably about 6 to 8 parts by weight of an inert organic solvent, and about 0.4 to 2.5, and preferably about 1 to 2.1 parts by weight of water, continuously feeding the initial slurry into a first apparatus suitable for operation at elevated pressure, and mixing the initial slurry therein with at least one etherifying agent which is gaseous at atmospheric pressure and at room temperature, and which has been liquified under pressure; maintaining the slurry in the first apparatus at a temperature of up to about 40° C., and under a gauge pressure of up to about 3 bars, for a residence time of from about 15 to 90 minutes, to give a degree of substitution in the range of from about 0.2 to about 1.0; continuously circulating the slurry in the first apparatus in a loop through a homogenizing device, to form a homogenized slurry; continuously feeding the homogenized slurry through a tubular reactor having a conveying device, and reacting the homogenized slurry in the reactor for a residence time of about 70 to 180 minutes at a temperature of from about 30° C. to 120° C., under a gauge pressure of up to about 10 bars; and continuously transferring the reacted slurry from the reactor into a cooling device.

In accordance with another aspect of the invention, the initial slurry of the process further comprises an etherifying agent which is solid or liquid at atmospheric pressure, and the total proportion of etherifying agent added to the initial slurry and to the first apparatus is 0.3 to 3.2 parts by weight per part of cellulose.

In accordance with a further aspect of the invention, the process of the invention further comprises the step of continuously feeding the homogenized slurry from the first apparatus into at least one second apparatus suitable for operation at elevated pressure, and maintaining the homogenized slurry in the second apparatus at a temperature of up to about 40° C., and under a gauge pressure of up to about 3 bars, for a residence time of from about 15 to 90 minutes, to give a degree of substitution in the range of from about 0.5 to 1.5. Further etherifying agent or modifying agent may be introduced in liquid or dissolved form into the slurry in at least one of the devices suitable for operation at elevated pressure.

In still another aspect of the process of the invention, the temperature is controlled such that the inlet temperature of the slurry in the tubular reactor is up to about 40° C., the temperature of the slurry is raised to up to about 60° C. in the first part of the reactor, during about 30 to 90 minutes of residence time, and a temperature of about 60° C. to 120° C. is maintained in the second part of the tubular reactor during the remaining 40 to 90 minutes of residence time, under a gauge pressure of up to about 5 bars. Preferably, the total residence time in the tubular reactor is 90 to 140 minutes.

In accordance with still another aspect of the invention, there is provided an apparatus for the continuous production of hydroxyalkyl cellulose and mixed ethers thereof, comprising means for alkalizing cellulose under atmospheric pressure, preferably a stirred kettle; at least one means for partially etherifying a slurry of alkalized cellulose, preferably a stirred autoclave, the first of which is connected to the alkalizing means such that alkalized cellulose may flow continuously thereinto, the etherifying means having a stirrer, and being adapted for operation at elevated pressure; means, attached to the alkalizing means and to each of the etherifying means, for homogenizing a slurry contained in each of the etherifying means; means for circulating a slurry from the alkalizing means and each etherifying means in a loop; a tubular reactor, adapted to continuously receive partially etherified slurry from the last of the etherifying means, comprising several tubes, wherein the etherification of the cellulose may be completed, the length to diameter ratio of the tubes of the tubular reactor being from about 10 to 200, and preferably from about 20 to 100 to 1; means associated with the tubes for adjusting the temperature of a slurry in the tubes; means for conveying a slurry through the tubular reactor; and means for cooling a slurry, adapted to continuously receive a slurry from the tubular reactor, and preferably in the first tube of the tubular reactor has a non-conveying, homogenizing agitator, and the remaining tubes of the tubular reactor have conveying devices.

Further objects, features, and advantages of the present invention will become apparent from the detailed description of preferred embodiments which follows when considered in connection with the attached drawing.

BRIEF DESCRIPTION OF THE DRAWING

FIG. 1 is a diagram of the process and of an apparatus for performing the process.

DETAILED DESCRIPTION OF PREFERRED EMBODIMENTS

Examples of water-soluble hydroxyalkyl celluloses and the mixed ethers based on hydroxyalkyl cellulose contemplated by the invention include in particular hydroxyethyl cellulose (HEC), hydroxypropyl cellulose (HPC), hydroxyethyl-hydroxypropyl cellulose (HEHPC), hydroxyethyl-methyl cellulose (HEMC), hydroxyethyl-ethyl cellulose (HEEC), hydroxyethyl-hydroxypropyl-methyl cellulose (HEHPMC) and hydroxyethyl-carboxymethyl cellulose (HECMC), and, if a substituent is present which does not carry an hydroxyalkyl group or is such a group (for example, carboxymethyl, methyl or ethyl), the degree of substitution by this substituent is at most about 1.0. Preferably, HEC or HECMC are manufactured by the process according to the invention.

The cellulose used is either of natural origin, for example, cotton linters or wood pulp, or it is present in the regenerated form, such as cellulose hydrate; the particle size of the cellulose should, as far as possible, be smaller than about 1 mm, in particular smaller than about 0.75 mm, before the start of the alkalization.

The alkali metal hydroxide—customarily NaOH—is used in the solid form or, more advantageously, in the dissolved form as an aqueous alkali metal hydroxide solution with a concentration of from about 2 to about 60% by weight. Preferred organic solvents used are isopropanol, acetone, hexane, tert.-butanol or mixtures of these solvents, and these can also already have been mixed with water. The indicated composition of the initial slurry merely indicates the sum of the constituents, which are detectable therein, at the start of the process. Of course, for example, the cellulose has already been partially transformed into alkali cellulose after a certain period. For the manufacture of certain hydroxyalkyl celluloses or mixed ethers based on hydroxyalkyl cellulose, solid or liquid etherifying agents, for example, Na monochloroacetate, monochloroacetic acid, propylene oxide or solutions of these can already be added under atmospheric pressure and at room temperature (about 20° to 25° C.) to this first process step (alkalization) which can be carried out under atmospheric pressure. The etherifying agents which are gaseous under atmospheric pressure and at room temperature, such as ethylene oxide, are added in liquefied form under pressure only after the slurry has been transferred into an apparatus which is suitable for elevated pressure. The reaction conditions are here selected such that the cellulose is initially only partially etherified (incipient etherification), i.e., a range from about 0.2 to about 1.0 is attained for the degree of substitution. The term "degree of substitution" is to be understood as the MS (molar degree of substitution) in the case of hydroxyalkyl substituents or other etherifying agents which are capable of multiple substitution. It is to be understood as the DS (average degree of substitution) in the case of etherifying agents which are not capable of multiple substitution, and, in the case of several different substituents (for example, HE and CM) it is also to be understood as the sum of the MS or DS values of the different substituents.

In preferred embodiments of the process according to the invention, a slurry is produced in the alkalizing stage from 1 part by weight of cellulose, 0.2 to 0.4 part by weight of alkali metal hydroxide, 6 to 8 parts by weight of organic solvent and 1.0 to 2.1 parts by weight of water, and the proportion of etherifying agent in the alkalization stage and/or incipient etherification stage is about 0.6 to 2.0 parts by weight per part by weight of cellulose.

The slurry of the incipient etherification stage is reacted in a further embodiment of the invention in at least one further apparatus suitable for operation under elevated pressure at a temperature of up to about 40° C., under a gauge pressure of up to about 3 bars and with a residence time of about 15 to 90 minutes, until a degree of substitution of about 0.5 to 1.5 is reached. Further etherifying agent and/or a modifying agent (for example, a cross-linking agent) can be fed in the liquid or dissolved form to the slurry in at least one of the apparatuses suitable for operation under elevated pressure.

The slurries of the alkalization, incipient etherification and, if appropriate, modifying stages are each circulated through a homogenizing device in a loop up to 250 times per hour and are then fed to the next particular stage.

The final etherification stage in a tube reactor is advantageously carried out in such a way that the inlet temperature of the slurry is up to about 40° C., the temperature of the slurry is then raised in the first part of the tubular reactor up to about 60° C. during about 30 to 90 minutes of residence time and a temperature of about 60° C. to 120° C. is maintained in the second part of the tubular reactor during the remaining 40 to 90 minutes of residence time, the gauge pressure being up to about 5 bars. As far as possible, the degree of filling of the tube reactor is 100%. Before or during this etherification stage, one or more additional quantities of etherifying agent and/or modifying agent can be added to the slurry. In the case of mixed ethers, the etherification can be taken up to a MS of about 6.0 or an overall DS of about 2.3 and, in the case of simple ethers, it can be taken up to a MS of about 4.5 or a DS of about 1.3. After all the etherification stages have ended, the slurry is cooled in a cooling tube or cooling vessel, these being operated essentially under atmospheric pressure.

The further working-up takes place in accordance with known process stages. The neutralization of the alkaline slurry can be effected before, during, or after the cooling stage, using a suitable acid, and auxiliaries for conditioning the cellulose ether (for example, for bleaching or for improving the solution properties of the cellulose ether formed, such as an incipient swelling retarder) can also be added. The cooled slurry is then separated into the moist solid (the cellulose ether) and the major part of the liquid substances and substances dissolved in the liquid; this separation is carried out, for example, in a decanting centrifuge, which as a rule is followed, on the one hand, by further purification of the cellulose ether, for example, with aqueous organic solvents and/or pure organic solvents and by drying up to the desired degree of drying, and on the other hand, working-up of the separated liquid reactants, for example, a redistillation of the organic solvents, can also be effected downstream.

Equipment, which is suitable for carrying out the process according to the invention, comprises an apparatus, operated under atmospheric pressure, with a stirrer for carrying out the alkalization of the cellulose; at least one apparatus, operated under elevated pressure, with a stirrer for carrying out the partial etherification and/or, if appropriate, the modification of the cellulose; apparatuses for circulating the particular slurry through a homogenizer, one of these apparatuses and one of the homogenizers being in each case associated with one of the apparatuses for carrying out the alkalization, etherification and/or modification, and circulating the particular slurry in a loop; a tubular reactor, consisting of several tubes, for adjusting the temperature of the slurry by means of a jacket and for completing the etherification of the cellulose; an apparatus for cooling the slurry withdrawn from the last tube of the tubular reactor; and connecting lines between the equipment parts.

In particular, the first tube of the tubular reactor has a non-conveying, homogenizing agitator and the remaining tubes of the tubular reactor have a conveying device. The length/diameter ratio of the tubes of the tubular reactor is about 10–200 to 1, preferably about 20–100 to 1. Advantageously, the homogenizers used with the alkalization stage and with the etherification/modification stages serve also to pump the slurry to be circulated and are designed, for example, as pin mills or toothed disc mills. It is also possible, however, to outfit this part in such a way that, in addition to the homogenizer, a pump is also built into the circulation device which, in both embodiments, usually starts in each case to withdraw slurry at the bottom of the equipment in the form of a by-pass and return the slurry again into the upper end of the equipment, whereby the particular slurry is continuously circulated through the homogenizer. The tubes of the tubular reactor preferably each have a jacket which is sub-divided into several parts, the individual sections of which can be heated or cooled independently of one another (temperature adjustment).

Although it is possible that individual stages of the process according to the invention and/or individual parts of the equipment according to the invention are already known, this does not apply to the combination of all the individual features, which makes it possible for the first time to carry out a fully continuous process for the manufacture of water-soluble hydroxyalkyl ethers or mixed ethers thereof, in particular, the manufacture of HEC or HECMC, and also to carry out chemical modifications, such as, for example, a quaternary ammonium salt of HECMC. The combination of the alkalization and pressurized incipient etherification equipment arranged in series with the tubular reactor permits the etherification reaction (pressure, temperature) to be controlled very precisely, and it is thus also possible to attain high degrees of etherification and high viscosities. The etherification takes place very evenly since, on the one hand, the etherification takes place stagewise and, on the other hand, back-mixing of cellulose particles which are etherified to different degrees is greatly diminished. The admixture of the most diverse chemicals can be effected at several points of the equipment, so that the process and the equipment can be used with great adaptability for the manufacture of many variants on the cellulose ether molecule (mixed ethers, cross-linkings and the like) and/or for conditioning the cellulose ether (retarding incipient swelling, dissolving aids). The temperature of the conveying device in the tubular reactor can also be adjusted. Back-mixing of the slurry conveyed through the tubular reactor is almost completely avoided by the special design and by adjusting the speed of rotation of the conveying device. Due to filling the tubular reactor, as far as possible, to 100%, high throughputs can be obtained, on the one hand, and, on the other hand, the backflow of parts of the slurry is additionally diminished. The possibility of running the process in a closed system, in combination with flushing by inert gases, such as nitrogen, can repress the depolymerization of the cellulose due to the action of atmospheric oxygen.

In the following text, the process according to the invention and the equipment according to the invention are further explained by reference to the drawing:

Cotton linters or wood pulp (1) supplied as a roll are fully continuously comminuted or defibrillated in a mill (2), delivered via a cyclone (3) onto a conveyor-type scale (4) and metered from the latter fully continuously into an open-top stirred kettle (5). At the same time, aqueous NaOH solution (6), an organic solvent (7) and, if appropriate, further chemicals (8), are fed from stock vessels into the stirred kettle (5) fully continuously with the aid of metering devices (9), in particular pumps. The aqueous NaOH solution and the inert organic solvent can be sprayed simultaneously via a common nozzle or separate nozzles onto the surface of the contents of the kettle.

The kettle (5) has a stirrer (10), a homogenizing pump (11) and a by-pass (12), through which the contents of the kettle are continuously circulated and homogenized. With the aid of the jacket (13), the contents of the kettle are kept at the desired temperature. By means of the metering device (14), a part stream is withdrawn continuously from the by-pass and pumped into the pressurized stirred autoclave (15) which has fittings (10, 11, 12, 13 and 14) comparable to those of the preceding kettle (5), and this also applies for the possible downstream pressurized stirred autoclaves.

The liquefied etherifying agent (16)—for example, ethylene oxide—and, if appropriate, further chemicals or etherifying agents are metered into the stirred autoclave (15) and the incipient etherification is carried out up to the desired degree.

Via the metering device (14), for example, a pump, a part stream is continuously passed into the stirred autoclave (17), where further etherifying agents or modifying agents can be admixed. In the drawing, the stirred autoclave (17) is shown with a different cross-section in order to make it clear that the important point for these kettles or autoclaves is not the shape but the principle: stirrer plus homogenizing circulation. After the desired degree of etherification has been reached in the cascade of stirred kettle/stirred autoclave—it being possible to use further stirred autoclaves of the same type as shown—the slurry is pumped continuously into the tubular reactor. Before entering the first tube of the tubular reactor, further chemicals can continuously be fed into the slurry stream at the point (19). The first tube (18) of the tubular reactor contains a paddle agitator (33) which runs at 50 to 660 rpm and which does not convey but only homogenizes. On flowing through this tube, the slurry is heated up, and this is continued up to the end of the second tube (20). Like all the succeeding tubes, the tube (20) is fitted with an impeller (21) which can be heated and the conveying speed of which corresponds as accurately as possible to the theoretical mean flow velocity of the slurry in the tube, whereby backflow (back-mixing) is avoided. The tube (20) is provided with an expansion vessel (22) which protrudes beyond the level of the first tube and acts in the manner of an air chamber, that is to say it can dampen pressure fluctuations which may occur in the tubular reactor.

The temperature of the expansion vessel (22) can be adjusted, and all the tubes have a jacket (34) which is sub-divided into several parts, and the sections of which can be adjusted independently of one another with respect to the temperature. The slurry passes from the tube (20) to the tube (24) either by gravity and the flow pressure or by means of a pump (as at the exit from the tubular reactor). Further chemicals can be fed in at the inlet (23) of the tube (24). While flowing through the tube (24) the slurry is either still heated further or it is kept at a constant reaction temperature; this depends on the overall residence time and the number of tubes in the tubular reactor. The filling level in the tubular reactor is such that—disregarding the expansion vessel (22)—all the tubes are filled to the extent of 100%. The slurry with the cellulose ether which has been etherified up to the desired degree is continuously pumped out of the last tube (24) of the tubular reactor by means of a pump (25) in such a way that the filling level in the tubular reactor remains unchanged. At the inlet (26) of the cooling section (27), which is designed, for example, as a tube, further chemicals (for example, an incipient cross-linking agent, such as glyoxal) can be fed to the slurry, which are intended to impart, for example, certain solution properties (retardation of incipient swelling) to the cellulose ether formed. The cooling tube (27) contains a stirring device (21) which can be a spiral or helical coil to convey and mix the slurry. The cooling tube is—like the other tubes—filled to the extent of 100% and has two top attachments (28), serving as expansion vessels, and its temperature is adjusted via the jacket (34). The slurry is continuously pumped out of the cooling tube by means of a pump (29) in such a way that the filling level in the cooling tube remains constant. In the delivery line downstream of the pump (29), a mixing section (30) is provided which can be a so-called static mixer (for example a "Kenics mixer"). Immediately upstream of this mixer, the acids (31) intended for the neutralization are metered into the delivery line. The mixing section (30) can also be located downstream of the pump (25) and upstream of the cooling tube (27). It is also possible to build in several such mixing sections, for example, in order to mix the slurry with the chemicals metered in, for example, at the point (26). The pump (29) delivers the slurry through the mixing section (30) to the decanting centrifuge (32), where the cellulose ether present in a suspended fibrous form is separated from the liquid constituents of the slurry. The crude, wet cellulose ether is then freed from the adhering by-products by known methods, for example, by washing with aqueous, organic solvents, and is brought into its marketable form.

To avoid degradation of the cellulose molecule and/or the cellulose ether molecule, various points of the equipment can be flushed with nitrogen; thus, for example, the first kettle (5) or the cooling section (27) can be blanketed with nitrogen.

The molar degree of etherification "MS" is defined as the mean number of molecules of alkylene oxide, which have been added to the base molecule of anhydroglucose, and the MS can exceed the number three. In contrast thereto, the degree of etherification "DS" denotes the mean number of substituted hydroxyl groups of the base molecule of anhydroglucose and, accordingly, it can reach the number three as a maximum. The viscosities of the cellulose ethers prepared were determined, using a Hoeppler falling-ball viscometer, at 20° C. in a 2% strength aqueous solution. The quality of the cellulose ethers was assessed by measuring the turbidities of the 2% strength aqueous solutions with a turbidity meter from Messrs. Dr. B. Lange (in scale divisions), a turbidity of up to 10 scale divisions still being regarded as satisfactory. Moreover, the content of fibers and swelling bodies in the solutions was visually evaluated.

EXAMPLE 1

Per hour, 200 parts by weight of a wood pulp are continuously ground in a screen basket cutting mill, with the 400 μm screen basket inserted, and are passed into an open-top stirred kettle subject to atmospheric pressure. At the same time, 180 parts by weight of a 27% strength by weight aqueous NaOH solution per hour are sprayed, together with 1,520 parts by weight of aqueous, 87% strength by weight isopropanol, through a nozzle onto the surface of the contents of the kettle. The contents of the kettle are stirred and, moreover, continuously withdrawn at the bottom by means of a toothed disc mill (homogenizer) acting as a pump and passed 80 times per hour through a by-pass ending in the cover. The kettle is cooled so that the temperature does not exceed 25° C. The mean residence time of the slurry in this kettle is 60 minutes. By means of a pump, a part stream of the slurry is continuously taken from the by-pass in such a way that the filling level in the kettle remains constant, and the part stream is pumped into a pressurized stirred autoclave. The latter is fitted, like the first kettle, with a stirrer, a homogenizing pump and a by-pass. The contents of this stirred autoclave pass 100 times per hour through the by-pass. 230 parts by weight of ethylene oxide per hour are continuously metered into the pressurized stirred autoclave. Via the jacket, a temperature of 30° C. is maintained in this kettle. The gauge pressure does not exceed 0.5 bar and the mean residence time is 54 minutes. By means of a pump, a part stream of 2,130 parts by weight/hour is continuously withdrawn from the by-pass and transferred into a further pressurized stirred autoclave. Although the latter has a cross-section which differs from that of the first two kettles, it is fitted like these with a stirrer, a homogenizing pump and a by-pass. The slurry is passed 150 times per hour through the by-pass. The contents of the kettle are adjusted to a temperature of 30° C., the mean residence time is 66 minutes and the gauge pressure is 0.3 bar as a maximum.

2,130 parts by weight/hour of a part stream, in which the cellulose ether represents a hydroxyethyl cellulose having a MS of 0.63 and a DS of about 0.40, are continuously withdrawn from the by-pass by means of a metering pump and pumped into a tubular reactor, the overall length/diameter ratio of which is 62 to 1. The first tube of the tubular reactor contains an impeller, of which the pitch and speed of rotation precisely correspond to a delivery output of 2,130 parts by weight/hour. By means of four jackets, which can be heated independently of one another, the reaction composition is heated so that after 50 minutes it has a temperature of 60° C. at the end of the tube. It passes through a connector into a second tube which is located below the first tube and which, like the first tube, is fitted with an impeller giving a delivery of 2,130 parts by weight/hour. With the aid of a jacket sub-divided into three parts, the reaction composition is kept in this second tube at the constant temperature of 75° C., and both tubes are filled to the extent of 100%. The upper tube is fitted with a vapor dome to which a level controller is attached, and the mean gauge pressure in the tubular reactor is 0.7 bar. After a total residence time of 100 minutes, 2,130 parts by weight/hour of the hot slurry at 75° C. are continuously pumped out at the end of the lower tube and are then conveyed into the cooling tube. In the line leading to the latter, the slurry passes through a static mixer, at the inlet of which 123 parts by weight per hour of 62% strength by weight aqueous nitric acid are metered in.

The cooling tube is fitted with an impeller which runs at high speed in order to effect thorough mixing. At the end of the cooling tube, the neutral slurry, cooled to 25° C., is continuously pumped out after 50 minutes residence time and is delivered to a decanting centrifuge, where the hydroxyethyl cellulose present in fibrous form as a suspension is separated from the major part of the liquid constituents of the slurry. The crude, solvent-wet HEC is then purified and worked up by known processes.

A series of samples, taken hourly over a period of 7 hours, shows a mean viscosity of 23,000 mPa.s and a turbidity of 3.9 scale divisions; no fibers and only a few swelling bodies can visually be detected, the $MS_{HE}$ is about 2.28±0.04 and the $DS_{HE}$ is about 1.11±0.01, these values demonstrating the uniformity of the etherification.

EXAMPLE 2

Per hour, 190 parts by weight of cotton linters are continuously ground in a screen basket cutting mill, with the 250 μm screen basket inserted, and are passed into an open-top stirred kettle subject to atmospheric pressure. At the same time, 205 parts by weight of 29% strength by weight aqueous NaOH solution per hour are sprayed, together with 1,500 parts by weight of aqueous 87% strength by weight isopropanol, through a nozzle onto the surface of the contents of the kettle. Moreover, 80 parts by weight per hour of an antioxidant solution are metered into the kettle from a stock vessel. The temperature is kept at 20° C. The manner of homogenizing, the residence time and the continuous transfer into the downstream first pressurized stirred autoclave and the homogenization in the latter are carried out as in Example 1.

281 parts by weight of ethylene oxide per hour are metered into the slurry in the first pressurized stirred autoclave. The temperature is maintained at 30° C. by means of the temperature adjustment jacket. The mean residence time is 60 minutes and the gauge pressure is 1.4 bar as a maximum. The analysis of the contents of the kettle gives a $MS_{HE}$ of 0.32 and a $DS_{HE}$ of 0.21 for the incipiently etherified cellulose.

2,256 parts by weight per hour are continuously withdrawn from the by-pass of the first pressurized stirred autoclave by means of a pump and metered into a second pressurized stirred autoclave, to which again 80 parts by weight/hour of antioxidant solution are added. The second pressurized stirred autoclave is constructed analogously to the pressurized stirred autoclave of Example 1, and the homogenization and temperature adjustment are carried out as in Example 1. The mean residence time is 60 minutes and the gauge pressure is 0.7 bar as a maximum. The analysis of the kettle product gives a $MS_{HE}$ of 0.70 and a $DS_{HE}$ of 0.45 for the intermediate product.

A part stream of 2,336 parts by weight/hour is continuously withdrawn from the by-pass of the second pressurized stirred autoclave by means of a metering pump and pumped into a tubular reactor in which the length/diameter ratio of all the tubes is 75:1. The first tube contains a paddle agitator which runs at 150 revolutions/minute and does not convey but only homogenizes the slurry which has been pumped in. From this first tube, the reaction composition passes via a connector into a second and from the latter into a third tube. The second and the third tube contain an impeller, of which the speed of rotation and the pitch precisely correspond to a delivery output of 2,336 parts by weight/hour. The temperature in the tubes is adjusted by means of heating or cooling jackets, which are subdivided into several parts, in such a way that the reaction slurry entering at 30° C. has been heated to 40° C. at the end of the first tube, a temperature of 60° C. prevails at the end of the second tube and a mean temperature of approximately 80° C. is maintained in the third tube from just after the inlet up to the end. The residence times are 20 minutes in the first tube and 50 minutes in each of the two other tubes. The degree of filling of the tubes is maintained at about 100% with the aid of a vapor expansion dome on the second tube, and the gauge pressure is 2.5 bars as a maximum.

At the end of the last tube, 2,336 parts by weight/hour of the hot slurry are continuously pumped out and conveyed into a further tube for cooling. On the way to the latter, the slurry passes through a mixing device built into the delivery line. In this mixing device, the slurry is intensively mixed with 160 parts by weight of 30% strength by weight aqueous HCl solution and about 10 parts by weight of 100% strength acetic acid per hour.

Like the preceding reaction tubes, the tube used for cooling is equipped with a conveying coil (impeller) which runs at relatively high speed in the cooling device so that the considerable back-mixing associated therewith is exploited for more rapid cooling and compensation of possible fluctuations in the pH-value of the slurry. The pH-value of the neutral slurry is 6 on average. As in Example 1, the cooled, neutral slurry is continuously pumped out at the end of the cooling tube and treated further. A series of samples taken hourly over a period of 9 hours shows a mean viscosity of 160,000 mPa.s and a turbidity of 9 scale divisions; occasional fibers and only a few swelling bodies can be visually detected. The series of samples gives a $MS_{HE}$ of 2.60±0.03 and a $DS_{HE}$ of 1.13±0.01, which indicates very uniform etherification.

EXAMPLE 3

Per hour, 220 parts by weight of a wood pulp are continuously ground in a screen basket cutting mill with a 750 μm screen basket and are passed into a kettle analogous to Example 1. At the same time, 188 parts by weight of 28% strength by weight NaOH solution per hour are sprayed, together with 1,580 parts by weight of aqueous 87% strength by weight isopropanol, through a nozzle onto the surface of the contents of the kettle. The homogenization, temperature adjustment and residence time in the first kettle and the continuous delivery into the downstream first pressurized stirred autoclave are carried out as in Example 1, with the difference that the part quantity withdrawn now consists of 1,988 parts by weight/hour.

200 parts by weight of ethylene oxide are added per hour to the first pressurized stirred autoclave and the slurry is homogenized, adjusted in temperature and given a residence time as in Example 1, and the gauge pressure is 0.7 bar as a maximum. The analyses of the intermediate product give a $MS_{HE}$ of 0.2 and a $DS_{HE}$ of 0.1. From the by-pass, a part stream of 2,188 parts by weight per hour is continuously pumped out into a second pressurized stirred autoclave in accordance with the data of Example 1 and is treated there. A gauge pressure of 0.45 bar as a maximum is established, and the degrees of etherification for the intermediate product in this stage are $MS_{HE}=0.76$ and $DS_{HE}=0.44$.

From the by-pass of the second pressurized stirred autoclave, 2,188 parts by weight per hour of the slurry are continuously withdrawn and pumped into a tubular reactor according to Example 1 and it is adjusted there in temperature, conveyed and given a residence time. A maximum gauge pressure of approximately 2 bars is established.

At the end of the third tube, 2,188 parts by weight per hour of the hot slurry are continuously pumped out and delivered into a further tube which is constructed exactly like the third tube. In the line leading to the further tube, the slurry passes through a static mixer, at the inlet of which 45 parts by weight per hour of 2.1% strength by weight aqueous $H_2O_2$ solution (for degrading the viscosity) are metered in. The slurry remains for 50 minutes in the downstream tube. The tube is heated in such a way that an internal temperature of 65° C. prevails, and the speed of rotation and pitch of the impeller are adjusted to a delivery output of 2,233 parts by weight/hour. At the end of the tube, 2,233 parts by weight of the slurry per hour are pumped out continuously and delivered, in accordance with Example 2, via a mixing device, built into the line, into a further tube for cooling. At the inlet of the mixing device built into the line, 126 parts by weight per hour of 30% strength by weight aqueous HCl solution and 19 parts by weight of 100% strength acetic acid are metered in. At the end of the tube, used for cooling as in Example 2, 2,378 parts by weight per hour are continuously withdrawn and, as in Example 1, pumped to a decanting centrifuge and treated further.

The result of a series of samples taken hourly over a period of 6 hours is that the hydroxyethyl cellulose has a mean viscosity of 21.5 mPa.s and a turbidity of 2.4 scale divisions. No fibers or swelling bodies can be visually detected. The degrees of etherification are $MS_{HE}=1.81\pm0.04$ and $DS_{HE}=1.06\pm0.02$.

EXAMPLE 4

Per hour, 196 parts by weight of a wood pulp are continuously ground in a screen basket mill with a 400 μm screen basket and are passed into a kettle according to Example 1. At the same time, 200 parts by weight of aqueous 30% strength by weight NaOH solution per hour are sprayed, together with 1,560 parts by weight per hour 87% strength by weight aqueous isopropanol, onto the surface of the contents of the kettle, and 40 parts by weight per hour of an antioxidant solution are pumped in from a stock vessel. Moreover, via a metering device for solid bulk materials (for example, a metering screw), 81 parts by weight of crystalline Na monochloroacetate are added per hour from a stock bunker. The homogenization, temperature adjustment and residence time in the first kettle and the continuous conveying into the downstream first pressurized stirred autoclave are carried out analogously to Example 1, but 2,077 parts by weight per hour are continuously withdrawn from the by-pass.

In the first pressurized stirred autoclave, 230 parts by weight of ethylene oxide per hour are added and the mixture is homogenized, adjusted in temperature and given a residence time analogous to Example 1, and the gauge pressure is 0.5 bar as a maximum. From the by-pass, 2,307 parts by weight per hour are withdrawn continuously and passed as in Example 1 into a second pressurized stirred autoclave and homogenized, adjusted in temperature and given a residence time; a gauge pressure of 0.5 bar as a maximum is established.

2,307 parts by weight per hour are continuously pumped out of the by-pass of the second pressurized stirred autoclave into a tubular reactor, constructed according to Example 2, and delivered and given a residence time as in Example 2. The temperature adjustment of the third tube, however, is set to a maximum temperature of about 100° C., and the resulting gauge pressure is 1.2 bar.

At the end of the third tube, 2,307 parts by weight per hour are continuously pumped out and, in the installations of Example 2, neutralized, cooled down and worked up. For neutralization, 74 parts by weight of 62% strength by weight aqueous HNO₃ solution and 5.5 parts by weight of acetic acid (100%) are added upstream of the mixing device built into the tube. Over a period of 12 hours, samples of the hydroxyethyl-carboxymethyl cellulose (HECMC) are withdrawn hourly, and a mixture of the samples and one single sample are investigated. The mixture has a $MS_{HE}$ of 2.38 and a $DS_{CM}$ of 0.40, and the single sample has a $MS_{HE}$ of 2.39 and a $DS_{CM}$ of 0.40. The viscosity of the salt-free CMHEC is about 5,000 mPa.s, the turbidity is 9 scale divisions and no fibers and only a few swelling bodies can be visually detected.

What is claimed is:

1. A continuous process for the manufacture of water-soluble hydroxyalkyl cellulose, and water-soluble mixed ethers based on hydroxyalkyl cellulose, comprising the steps of:
    producing an initial slurry comprising 1 part by weight of cellulose, about 0.02 to 0.6 parts by weight of an alkali metal hydroxide, about 5 to 10 parts by weight of an inert organic solvent, and about 0.4 to 2.5 parts by weight of water;
    continuously feeding said initial slurry into a first apparatus suitable for operation at elevated pressure, and mixing said initial slurry therein with at least one hydroxyalkyl etherifying agent which is gaseous at atmospheric pressure and at room temperature, and which has been liquefied under pressure;
    maintaining said slurry in said first apparatus at a temperature of up to about 40° C., and under a gauge pressure of up to about 3 bars, for a residence time of from about 15 to 90 minutes, to give a degree of substitution in the range of from about 0.2 to about 1.0;
    continuously circulating said slurry in said first apparatus in a loop through a homogenizing device, to form a homogenized slurry;
    continuously feeding said homogenized slurry through a tubular reactor having a conveying device, an inlet, a first part, and a second part, and reacting said homogenized slurry in said reactor for a residence time of about 70 to 180 minutes at a temperature of from about 30° C. to 120° C., under a gauge pressure of up to about 10 bars; and
    continuously transferring the reacted slurry from said reactor into a cooling device.

2. A process as disclosed in claim 1, wherein said initial slurry further comprises an etherifying agent which is solid or liquid at atmospheric pressure.

3. A process as disclosed in claim 1 or 2, wherein the total proportion of etherifying agent added to the initial slurry and to the first apparatus is 0.3 to 3.2 parts by weight per part by weight of cellulose.

4. A process as disclosed in claim 1, further comprising the step of continuously feeding said homogenized slurry from said first apparatus into at least one second apparatus suitable for operation at elevated pressure, and maintaining said homogenized slurry in said second apparatus at a temperature of up to about 40° C., and under a gauge pressure of up to about 3 bars, for a residence time of from about 15 to 90 minutes, to give a degree of substitution in the range of from about 0.5 to 1.5.

5. A process as disclosed in claim 4, wherein further etherifying agent is introduced in liquid or dissolved form into the slurry in at least one of said devices suitable for operation at elevated pressure.

6. A process as disclosed in claim 4, wherein a crosslinking agent is introduced in liquid or dissolved form into the slurry in at least one of said devices suitable for operation at elevated pressure.

7. A process as disclosed in claim 1, wherein said initial slurry comprises 1 part by weight of cellulose, 0.2 to 0.4 parts by weight of an alkali metal hydroxide, 6 to 8 parts by weight of organic solvent, and 1.0 to 2.1 parts by weight of water.

8. A process as disclosed in claim 3, wherein the total proportion of etherifying agent added to the initial slurry and to the first apparatus is about 0.6 to 2.0 parts by weight per part by weight of cellulose.

9. A process as disclosed in claim 1, wherein the inlet temperature of the slurry in said tubular reactor is up to about 40° C., the temperature of the slurry is raised to up to about 60° C. in said first part of said reactor, during about 30 to 90 minutes of residence time and a temperature of about 60° C. to 120° C. is maintained in the second part of the tubular reactor during the remaining 40 to 90 minutes of residence time, under a gauge pressure of up to about 5 bars.

10. A process as disclosed in claim 1 or 9, wherein the total residence time in the tubular reactor is 90 to 140 minutes.

11. A process as disclosed in claim 1, wherein additional etherifying agent is added in said tubular reactor.

12. A process as disclosed in claim 1, wherein a cross-linking agent is added in said tubular reactor.

13. A process as disclosed in claim 1, 2, 4, or 7, wherein said etherifying agent in said first apparatus is ethylene oxide.

14. A process as disclosed in claim 2, wherein said etherifying agent in said initial slurry is monochloroacetic acid, a salt of monochloroactic acid, or propylene oxide.

15. A process as disclosed in claim 3, wherein said etherifying agents are selected such that said process produces hydroxyethyl cellulose, hydroxypropyl cellulose, hydroxyethyl-hydroxypropyl cellulose, hydroxyethyl-methyl cellulose, hydroxyethyl-hydroxypropyl-methyl cellulose, hydroxyethyl-ethyl cellulose, or hydroxyethyl-carboxymethyl cellulose.

* * * * *